United States Patent
Park et al.

(10) Patent No.: US 12,301,336 B2
(45) Date of Patent: May 13, 2025

(54) WIRELESS COMMUNICATION DEVICE FOR PERFORMING INTERFERENCE WHITENING OPERATION AND OPERATING METHOD THEREOF

(71) Applicant: Samsung Electronics Co., Ltd., Suwon-si (KR)

(72) Inventors: Kwonyeol Park, Jeonju-si (KR); Hwanmin Kang, Suwon-si (KR); Daecheol Kwon, Seoul (KR); Hyungjong Kim, Seongnam-si (KR); Haejoon Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 559 days.

(21) Appl. No.: 17/504,834

(22) Filed: Oct. 19, 2021

(65) Prior Publication Data

US 2022/0247506 A1    Aug. 4, 2022

(30) Foreign Application Priority Data

Feb. 1, 2021    (KR) .................. 10-2021-0014400

(51) Int. Cl.
*H04J 11/00*    (2006.01)
*H04W 72/541*    (2023.01)

(52) U.S. Cl.
CPC ......... *H04J 11/005* (2013.01); *H04W 72/541* (2023.01)

(58) Field of Classification Search
None
See application file for complete search history.

(56) References Cited

U.S. PATENT DOCUMENTS

| | | | |
|---|---|---|---|
| 6,590,932 B1 * | 7/2003 | Hui | H04L 25/03993 375/348 |
| 6,944,434 B2 | 9/2005 | Mattellini et al. | |
| 8,126,099 B2 | 2/2012 | Wu et al. | |

(Continued)

FOREIGN PATENT DOCUMENTS

| | | | | |
|---|---|---|---|---|
| EP | 1481482 A1 * | 12/2004 | .......... | H04B 1/1027 |
| KR | 10-1524747 B1 | 6/2015 | | |

(Continued)

OTHER PUBLICATIONS

Extended European Search Report dated Jun. 30, 2022 issued in corresponding European patent application No. 22152228.7.

(Continued)

*Primary Examiner* — Christopher T Wyllie
(74) *Attorney, Agent, or Firm* — Harness, Dickey & Pierce, P.L.C.

(57) ABSTRACT

An operating method of a wireless communication device performing an interference whitening operation includes obtaining first channel state information of the wireless communication device, selecting a selected mode from among a plurality of modes related to the interference whitening operation, the selected mode corresponding to the first channel state information, obtaining channel performance information according to the selected mode, and updating a value function expected value based on the first channel state information, the selected mode, and the channel performance information.

18 Claims, 11 Drawing Sheets

(56) References Cited

U.S. PATENT DOCUMENTS

| | | | |
|---|---|---|---|
| 8,243,861 B2 | 8/2012 | Mostafa | |
| 8,774,044 B2* | 7/2014 | Liu | H04L 1/0026 |
| | | | 370/252 |
| 8,867,676 B2 | 10/2014 | Cairns | |
| 9,048,917 B1* | 6/2015 | Gomadam | H04L 25/03891 |
| 11,784,852 B2* | 10/2023 | Levinbook | H04L 5/0046 |
| | | | 375/262 |
| 2004/0266383 A1* | 12/2004 | Mattellini | H04L 25/03006 |
| | | | 455/307 |
| 2006/0063505 A1* | 3/2006 | Cairns | H04L 25/03006 |
| | | | 455/302 |
| 2008/0192870 A1* | 8/2008 | Wu | H04L 25/03299 |
| | | | 375/350 |
| 2009/0010148 A1* | 1/2009 | Hara | H04B 7/0626 |
| | | | 370/328 |
| 2009/0213944 A1* | 8/2009 | Grant | H04B 1/712 |
| | | | 375/260 |
| 2009/0213945 A1* | 8/2009 | Cairns | H04B 7/0413 |
| | | | 375/260 |
| 2010/0103834 A1* | 4/2010 | Gorokhov | H04L 1/0026 |
| | | | 370/252 |
| 2010/0227562 A1* | 9/2010 | Shim | H04L 25/03993 |
| | | | 455/63.1 |
| 2010/0254325 A1* | 10/2010 | Narasimhan | H04B 7/0417 |
| | | | 370/329 |
| 2016/0337879 A1* | 11/2016 | Hwang | H04L 27/0008 |
| 2017/0324455 A1* | 11/2017 | Soriaga | H04L 25/0202 |
| 2017/0324462 A1* | 11/2017 | Chen | H04B 7/0868 |
| 2018/0035316 A1* | 2/2018 | Kim | H04L 5/0035 |
| 2018/0070365 A1* | 3/2018 | Je | H04L 5/0073 |
| 2018/0115374 A1* | 4/2018 | Mishra | H04B 17/345 |
| 2018/0248719 A1* | 8/2018 | Horvat | H04L 25/03891 |
| 2018/0309601 A1* | 10/2018 | Kim | H04L 25/03828 |
| 2020/0287639 A1* | 9/2020 | Su | H04B 17/336 |
| 2022/0131588 A1* | 4/2022 | Elshafie | H04B 7/0626 |
| 2022/0247506 A1* | 8/2022 | Park | H04L 25/03165 |

FOREIGN PATENT DOCUMENTS

| | | |
|---|---|---|
| KR | 10-1877243 B1 | 7/2018 |
| WO | WO-03/073630 A1 | 9/2003 |

OTHER PUBLICATIONS

Park Kwonyeol et al., "The Reinforcement Learning based Interference Whitening Scheme for 5G", 2021 *IEEE 93rd Vehicular Technology Conference, IEEE*, Apr. 25, 2021, pp. 1-5.

Ana Galindo-Serrano et al., "Distributed Q-Learning for Aggregated Interference Control in Cognitive Radio Networks", *IEEE Transactions on Vehicular Technology, IEEE*, USA, vol. 59, No. 4, May 1, 2010, pp. 1823-1834.

\* cited by examiner

FIG. 5A

| $S_t$ | $S_1$ | $S_2$ | $S_3$ | $S_4$ | $S_5$ | ... | $S_{n-1}$ | $S_n$ |
|---|---|---|---|---|---|---|---|---|
| $a_t$ | $a_1$ | $a_0$ | $a_2$ | $a_0$ | $a_1$ | ... | $a_2$ | $a_1$ |

FIG. 5B

| $S_1$ | | $S_2$ | | $S_3$ | | ... | $S_n$ | |
|---|---|---|---|---|---|---|---|---|
| $a_t$ | $a_2$ | $a_1$ | $a_2$ | $a_1$ | $a_2$ | | $a_1$ | $a_2$ |
| $Q_1$ | $Q_2$ | $Q_3$ | $Q_4$ | $Q_5$ | $Q_6$ | | $Q_7$ | $Q_8$ |

WIRELESS COMMUNICATION DEVICE FOR PERFORMING INTERFERENCE WHITENING OPERATION AND OPERATING METHOD THEREOF

CROSS-REFERENCE TO RELATED APPLICATION

This application is based on and claims priority under 35 U.S.C. § 119 to Korean Patent Application No. 10-2021-0014400, filed on Feb. 1, 2021, in the Korean Intellectual Property Office, the disclosure of which is incorporated by reference herein in its entirety.

BACKGROUND

The inventive concepts relate to a wireless communication device, and more particularly, to a wireless communication device capable of performing an interference whitening operation and an operating method of the wireless communication device.

Wireless networks reuse frequencies to maximize or improve communication capacity, and increase efficiency, within a limited frequency band. For example, when a wireless communication device operates in an environment such as orthogonal frequency division multiple access (OFDMA), a region that receives signals overlapped between base stations exists, which may cause an inter-cell interference (ICI).

In the wireless communication device, it may be difficult to remove colored interference due to the ICI without specific information on adjacent cells. However, the wireless communication device may efficiently improve the quality of signals by performing an interference whitening operation.

SUMMARY

The inventive concepts provide a wireless communication device that efficiently performs an interference whitening operation through reinforcement learning.

According to an aspect of the inventive concepts, there is provided an operating method of a wireless communication device performing an interference whitening operation including obtaining first channel state information of the wireless communication device, selecting a selected mode from among a plurality of modes related to the interference whitening operation, the selected mode corresponding to the first channel state information, obtaining channel performance information according to the selected mode, and updating a value function expected value based on the first channel state information, the selected mode, and the channel performance information.

According to an aspect of the inventive concepts, there is provided an operating method of a wireless communication device performing an interference whitening operation including obtaining target channel state information of the wireless communication device, selecting a target mode among a plurality of modes corresponding to the target channel state information based on policy information, the policy information designating each of the plurality of modes in association with respective channel state information and a respective value function expected value, and performing communication according to the target mode, wherein the policy information is determined according to channel performance information obtained with respect to each of the plurality of modes.

According to an aspect of the inventive concepts, there is provided a wireless communication device including processing circuitry configured to obtain first channel state information, select a selected mode from among a plurality of modes related to an interference whitening operation, the selected mode corresponding to the first channel state information, obtain channel performance information corresponding to the selected mode, and update a value function expected value based on the first channel state information, the selected mode, and the channel performance information.

BRIEF DESCRIPTION OF THE DRAWINGS

Embodiments of the inventive concepts will be more clearly understood from the following detailed description taken in conjunction with the accompanying drawings in which:

FIGS. 5A and 5B are diagrams illustrating tables in which policy information is stored according to embodiments of the inventive concepts;

DETAILED DESCRIPTION

Hereinafter, embodiments of the inventive concepts will be described in detail with reference to the accompanying drawings.

Figure 1:
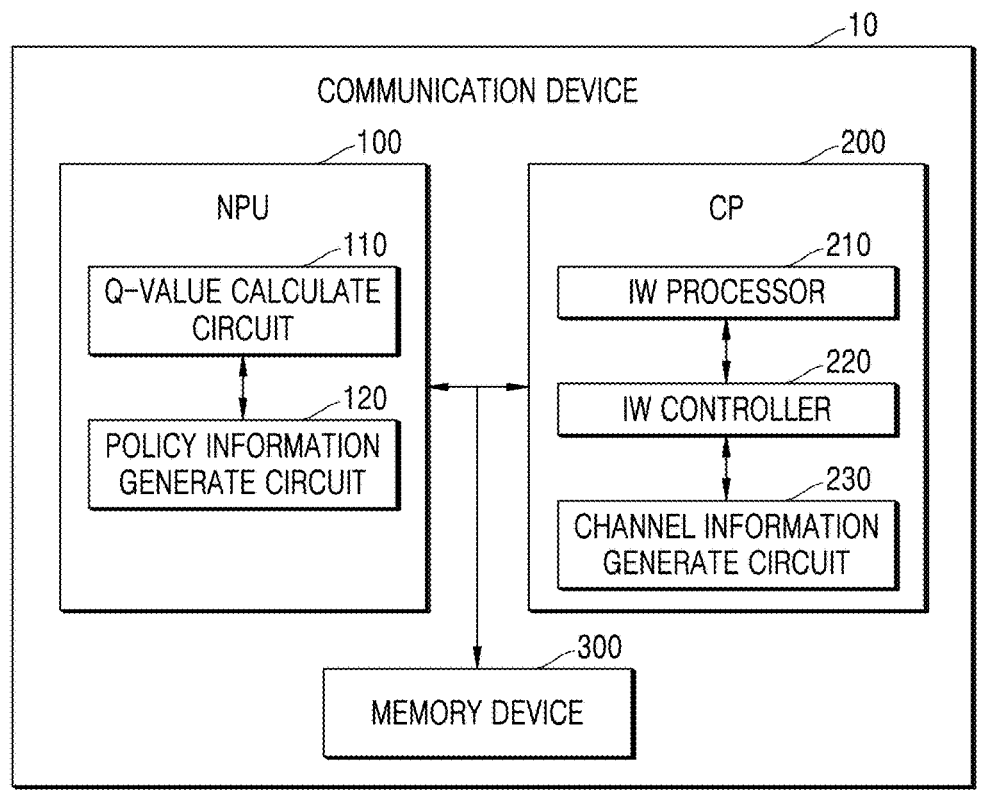
FIG. 1 is a block diagram illustrating the configuration of a wireless communication device according to embodiments of the inventive concepts.

FIG. 1 is a block diagram illustrating the configuration of a wireless communication device 10 according to embodiments of the inventive concepts.

Referring to FIG. 1, the wireless communication device 10 of the inventive concepts may include a neural process unit (NPU) 100, a communication processor (CP) 200, and/or a memory device 300. The NPU 100 may include a value function expected value generation circuit 110 and/or a policy information generation circuit 120. The value function expected value generation circuit 110 may generate a value function expected value based on channel state information and channel performance information of the wireless communication device 10. The value function expected value may be referred to as a reward value obtained according to a channel state and a channel performance determined according to whether an interference whitening operation is performed, and may include an immediate reward value and a future reward value (as used herein, the immediate reward value may refer to a value corresponding to a time before that corresponding to the future reward value, and may not denote a degree of immediacy or promptness). The channel state information may be information indicating whether a communication state is good when performing wireless communication, and may be, for example, a signal to noise ratio (SNR). The channel performance information may be information indicating the maximum or highest amount of data that may be communicated through a channel, and, for example, may be a channel capacity or a block error rate (BLER).

The policy information generation circuit 120 of the NPU 100 may determine policy information based on the value function expected value generated from the value function expected value generation circuit 110 or loaded from the memory device 300. For example, the value function expected value generation circuit 110 may generate a plurality of value function expected values corresponding to a case in which the wireless communication device 10 performs an operation with respect to each of a plurality of modes in a first channel state, and the NPU 100 may select any one of the plurality of value function expected values. For example, the NPU 100 may select a value function expected value having the largest value from among the plurality of value function expected values as any one value function expected value.

In this regard, the policy information generation circuit 120 may set a mode corresponding to the selected any one value function expected value as a mode related to interference whitening that the wireless communication device 10 should perform in the first channel state. The policy information generation circuit 120 may map channel state information in the first channel state and the set mode to generate the policy information in a table in which the mode is mapped to each of the channel state information, but embodiments of the inventive concepts are not limited thereto. For example, the policy information generation circuit 120 may map the value function expected value to a plurality of modes for each channel state information to generate the policy information. The policy information generated by the policy information generation circuit 120 will be described in detail later with reference to FIGS. 5A and 5B.

The communication processor 200 may process signals to be transmitted or received according to a communication method such as orthogonal frequency division multiplexing (OFDM), orthogonal frequency division multiple access (OFDMA), wideband code division multiple access (WCDMA), high speed packet access+ (HSPA+), etc. In addition, the communication processor 200 may process a baseband signal according to various types of communication methods (that is, various communication methods to which technologies of modulating or demodulating the amplitude and/or frequency of the baseband signal are applied).

The communication processor 200 according to embodiments of the inventive concepts may include an interference whitening processor 210, an interference whitening controller 220, and/or a channel information generation circuit 230. The interference whitening processor 210 may determine whether to perform an interference whitening operation based on a command output from the interference whitening controller 220. When performing the interference whitening operation, the interference whitening processor 210 may whiten colored noise in a specific frequency band to output whitened noise. Whitening of the communication signal by the interference whitening processor 210 will be described in detail later with reference to FIG. 2.

The interference whitening controller 220 may determine an interference whitening mode with respect to target channel state information based on the policy information received from the NPU 100. The interference whitening controller 220 may determine a type of command to be provided to the interference whitening processor 210 based on the interference whitening mode. For example, when the interference whitening mode corresponding to first channel state information is mapped to the policy information as an interference whitening activation mode, the interference whitening controller 220 may provide a command for performing the interference whitening operation to the interference whitening processor 210 when the wireless communication device 10 communicates in the first channel state.

The channel information generation circuit 230 may generate the channel state information and the channel performance information based on a value representing the channel state and channel performance. For example, the communication processor 200 may measure a signal and a noise component with respect to a communication frequency band, and the channel information generation circuit 230 may generate the SNR as the channel state information. In addition, the communication processor 200 may generate the channel performance information by measuring a value about how much data may be transmitted through a corresponding channel or calculating a channel capacity based on the SNR. Embodiments of the inventive concepts are not limited thereto, and the BLER may be generated as the channel performance information.

The memory device 300 of the wireless communication device 10 may include a memory region storing information about a communication operation, and at least one of the NPU 100 and the communication processor 200 may determine whether to perform the interference whitening operation in a corresponding channel state by loading information about the communication operation from the memory device 300. The memory device 300 may be, for example, provided as a random access memory (RAM) device such as dynamic random access memory (DRAM), synchronous DRAM (SDRAM), static RAM (SRAM), double date rate SDRAM (DDR SDRAM), DDR2 SDRAM, DDR3 SDRAM, phase-change RAM (PRAM), magnetic RAM (MRAM), resistive RAM (RRAM), etc.

The NPU 100 of the wireless communication device 10 may train a neural network model or generate an optimal or accurate value function expected value through a neural network operation, the communication processor 200 may perform arithmetic processing for the communication operation, and the NPU 100 and the communication processor 200 may be configured as different hardware modules to perform calculations. However, embodiments of the inventive concepts are not limited thereto, and the NPU 100 and the communication processor 200 may be configured as the same hardware module (or similar hardware modules) or mounted together on a single printed circuit board (PCB) to be also referred to as a software module that processes different types of calculations. In addition, the wireless communication device 10 may further include a power modulator, an RFIC, a power amplifier, a duplexer, and/or an antenna, as well as the NPU 100, the communication processor 200, and the memory device 300 shown in FIG. 1.

Further, the wireless communication device 10 shown in FIG. 1 may be included in a wireless communication system using a cellular network such as 5G, LTE, LTE-Advanced, etc., or may also be included in a wireless local area network (WLAN) system or any other wireless communication system. For reference, the configuration of the wireless communication device 10 illustrated in FIG. 1 is only an example, and is not limited thereto, and may be variously configured according to a communication protocol or a communication method.

Figure 2:
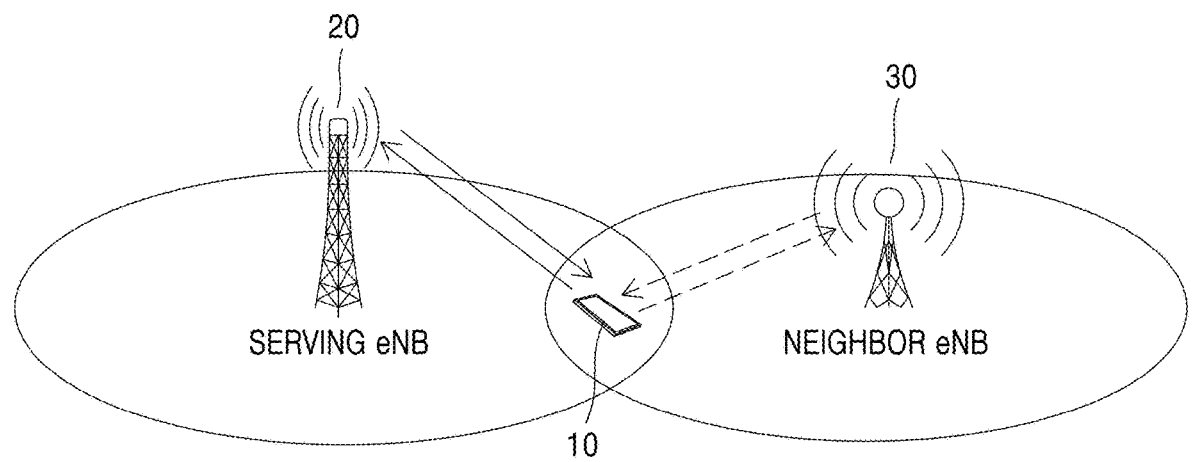
FIG. 2 is a diagram illustrating an example in which an inter-cell interference (ICI) occurs.

FIG. 2 is a diagram illustrating an example in which an inter-cell interference (ICI) occurs.

The wireless communication device 10 reuses a frequency band to maximize or increase communication capacity, and increase efficiency, within a limited frequency band. In such an environment, a region that receives signals that overlap between base stations is present, which may cause the ICI to occur. It is difficult to completely remove the ICI without specific information about adjacent cells causing interference, and thus, the wireless communication device 10 may whiten the ICI occurred by being colored at a specific frequency, thereby efficiently improving the quality of signal.

Specifically, the wireless communication device 10 may be optimized or configured to filter additive white Gaussian noise (AWGN) excluding a signal transmitted from a serving base station 20. At this time, when the wireless communication device 10 is located in a region where the signal transmitted/received from the serving base station 20 and a signal transmitted/received from a neighboring base station 30 overlap, the signals have correlations between antennas, which may cause the ICI in which noise of a specific frequency band is colored to occur.

The wireless communication device 10 may perform a maximum likelihood detection operation to perform a communication operation with optimal or improved performance when noise has a white characteristic and a noise variance is accurately measured, thereby, in the ICI, whitening colored noise through an interference whitening operation and obtaining a performance gain. For example, the wireless communication device 10 may measure characteristics between antennas of an interference signal and inversely compensate for the measured characteristics, thereby obtaining a white noise from which colorization has been removed or reduced.

However, the interference whitening operation involves the communication operation based on a limited reference signal such as a demodulation reference signal (DMRS), and thus in an environment where the quality of noise samples is poor, such as sufficient noise samples are not ensured or noise is more dominant than interference, the performance of the wireless communication device 10 may deteriorate. Accordingly, the wireless communication device 10 of the inventive concepts may adaptively perform the communication operation by selecting one of a plurality of interference whitening modes according to a channel environment in order to improve transmission/reception performance.

Figure 3:
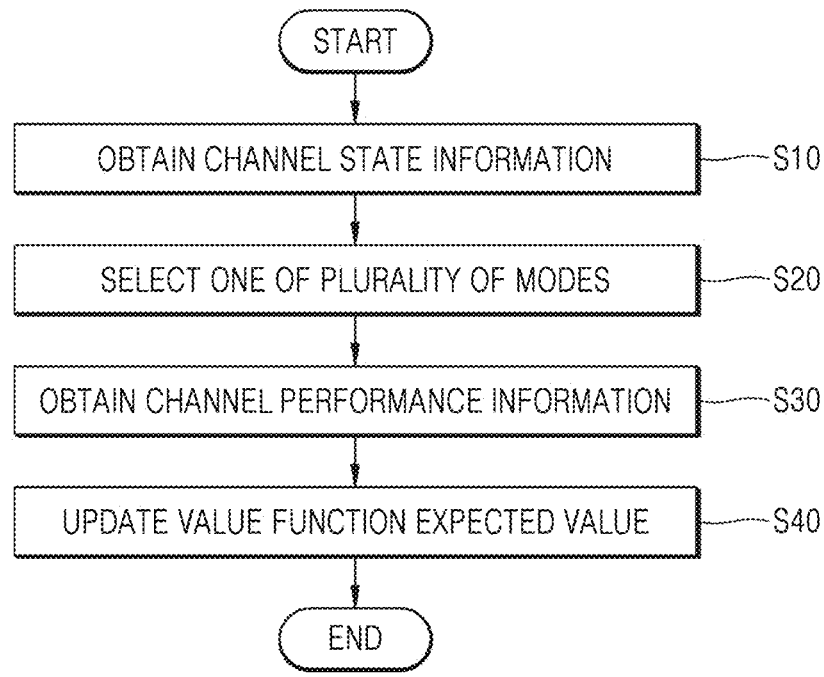
FIG. 3 is a flowchart illustrating a method, performed by a wireless communication device, of updating a value function expected value according to embodiments of the inventive concepts.

FIG. 3 is a flowchart illustrating a method, performed by the wireless communication device 10, of updating a value function expected value according to embodiments of the inventive concepts.

The wireless communication device 10 according to embodiments of the inventive concepts may select any one of a plurality of modes related to interference whitening based on channel state information, and obtain channel performance information according to the selected mode. The NPU 100 of the wireless communication device 10 may update the channel state information and a value function expected value according to the selected mode based on reinforcement learning.

In operation S10, the wireless communication device 10 may obtain the channel state information. The channel state information is an index indicating a channel environment, and may be, for example, a signal-to-noise ratio (SNR) or a signal-to-interference noise ratio (SINR).

In operation S20, the wireless communication device 10 may select any one of the plurality of modes. For example, the wireless communication device 10 may select any one of an interference whitening activation mode and/or an interference whitening deactivation mode, and when the interference whitening activation mode is selected, may perform an interference whitening operation to whiten a colored interference. In contrast, when the interference whitening deactivation mode is selected, the wireless communication device 10 may not perform (e.g., may skip performance of, block performance of, etc.) the interference whitening operation. The modes related to interference whitening that the wireless communication device 10 may select are not limited thereto, and may be classified according to the number of resource blocks to be assigned to the interference whitening operation.

According to embodiments, the wireless communication device 10 may select a mode corresponding to the channel state information based on policy information, and the policy information may be determined based on the value function expected value corresponding to each of the plurality of modes. According to embodiments, the wireless communication device 10 may select a mode randomly at a certain probability, and may select the mode based on the policy information at a remaining probability of the certain probability (e.g., when the mode is not selected randomly). According to embodiments, the wireless communication device 10 may generate a communication signal, perform the interference whitening operation corresponding to the selected mode on the communication signal, and/or transmit the communication signal to a base station (e.g., the serving base station 20) after the interference whitening operation is completed. According to embodiments, the wireless communication device 10 may receive a communication signal from the base station (e.g., the serving base station 20), perform the interference whitening operation corresponding to the selected mode on the communication signal, and/or demodulate the communication signal after the interference whitening operation is completed.

In operation S30, the wireless communication device 10 may obtain the channel performance information. Specifically, the wireless communication device 10 may obtain channel state information subsequent to the channel state information obtained in operation S10 according to the selected mode, and then obtain the channel performance information based on the subsequent channel state information. According to embodiments, the communication processor 200 may calculate the channel performance information from the channel state information. For example, the communication processor 200 may generate an absolute value of a difference between a channel capacity and a threshold value as the channel performance information based on the SINR as shown in Equation 1 below.

$$r_t = \begin{cases} \frac{1}{BW}\log_2(1+\gamma_t) - \tau_{th}, & \frac{1}{BW}\log_2(1+\gamma_t) > \tau_{th} \\ \tau_{th} - \frac{1}{BW}\log_2(1+\gamma_t), & \text{otherwise} \end{cases} \quad \text{[Equation 1]}$$

Here, $\gamma_t$ may denote the channel state information at time t, BW may denote a frequency bandwidth, and $\tau_{th}$ may denote the threshold value. The wireless communication device 10 of the inventive concepts may use a BLER as the channel performance information depending on the situation.

In operation S40, the wireless communication device 10 may generate a value function expected value with respect to the channel state information and the selected mode, and update the existing value function expected value. For example, the wireless communication device 10 may calculate the update expected value based on the subsequent channel state information according to the selected mode and/or the channel performance information obtained in operation S30, and may weighted-average the calculated expected value and a previous expected value based on a learning rate to generate the value function expected value different from the previous expected value. Embodiments in which the wireless communication device 10 calculates and updates the value function expected value will be described later with reference to FIG. 8. According to embodiments, the wireless communication device 10 may adaptively select a different mode among the plurality of modes based on the updated value function expected value. According to embodiments, the wireless communication device 10 may generate a communication signal, perform the interference whitening operation corresponding to the different selected mode on the communication signal, and/or transmit the communication signal to a base station (e.g., the serving base station 20) after the interference whitening operation is completed. According to embodiments, the wireless communication device 10 may receive a communication signal from the base station (e.g., the serving base station 20), perform the interference whitening operation corresponding to the different selected mode on the communication signal, and/or demodulate the communication signal after the interference whitening operation is completed.

The NPU 100 of the inventive concepts may select a mode related to interference whitening based on the channel state information obtained from the communication processor 200, and may update the value function expected value based on results of the selected mode. The wireless communication device 10 may reselect a mode corresponding to the channel state information based on the updated value function expected value. For example, when the updated value function expected value based on the selected first mode is smaller than a value function expected value according to a second mode, the wireless communication device 10 may change the mode from the first mode to the second mode with respect to the channel state information. That is, the wireless communication device 10 of the inventive concepts may adaptively perform the interference whitening operation according to a channel environment, and continuously check whether to change the mode related to interference whitening according to the obtained channel environment.

Figure 4:
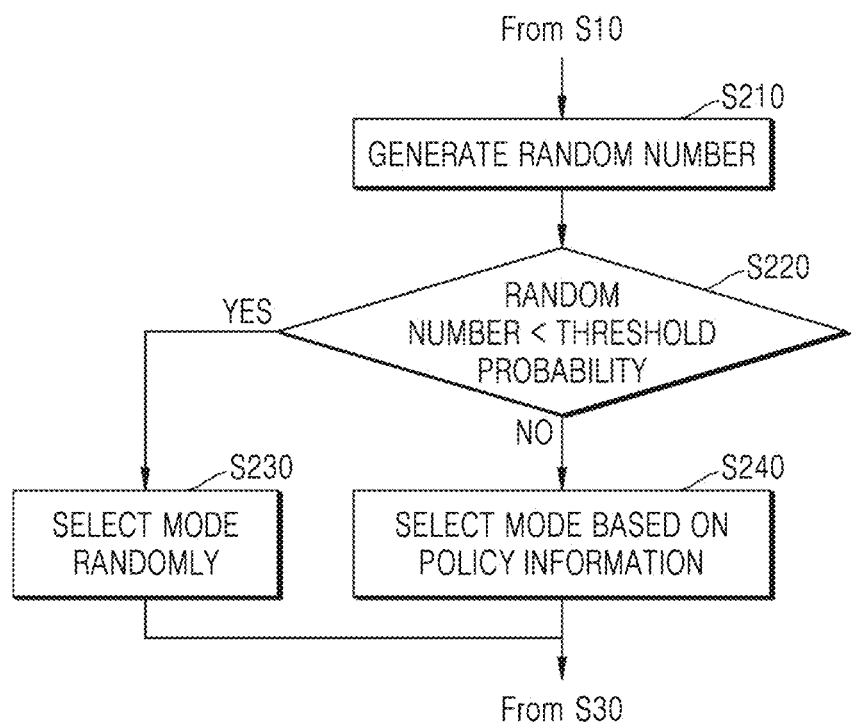
FIG. 4 is a flowchart illustrating a method, performed by a wireless communication device, of selecting one of a plurality of modes according to embodiments of the inventive concepts.

FIG. 4 is a flowchart illustrating a method, performed by the wireless communication device 10, of selecting one of a plurality of modes according to embodiments.

The wireless communication device 10 according to embodiments may select one of the plurality of modes based on policy information to operate in the mode having a maximum (e.g., highest) value function expected value, thereby improving channel performance. However, the wireless communication device 10 of the inventive concepts is not limited thereto, and may select the mode randomly at a certain probability according to embodiments of FIG. 4, and may select a mode based on the policy information at a remaining probability (e.g., an inverse of the certain probability).

The communication processor 200 of the wireless communication device 10 may further include a random number generator, and in operation S210, the random number generator may generate a random number. The random number may be, for example, referred to as a random probability, and may have a value between 0 and 1.

In operation S220, the communication processor 200 may compare the random number generated by the random number generator with a threshold probability. The threshold probability may be a preset or alternatively, given fixed probability, but may be a variable that changes according to a state of the wireless communication device 10. The threshold probability may be set high in response to a case where it is determined that the wireless communication device 10 according to embodiments is in a high mobility state, and may be set low in response to a case where it is determined that the wireless communication device 10 according to embodiments is currently in a low mobility state. Specifically, the wireless communication device 10 may determine a moving speed of the wireless communication device 10 as a mobility state based on location information generated from a global positioning system (GPS). When it is determined that the wireless communication device 10 has higher mobility than the previous mobility, the wireless communication device 10 may set a higher threshold probability than the previous threshold probability.

In operation S230, when it is determined that the random number is less than the threshold probability, the communication processor 200 may randomly select any one of the plurality of modes. For example, when the plurality of modes are divided into an interference whitening activation mode and an interference whitening deactivation mode, the communication processor 200 may randomly select one of the two modes.

In operation S240, when it is determined that the random number is greater than or equal to the threshold probability, the communication processor 200 may select one of the plurality of modes based on policy information. The policy information may be information in which any one of the plurality of modes corresponds to the obtained channel state information, or may be information in which a value function expected value is mapped to the channel state information. The policy information will be described in detail later with reference to FIGS. 5A and 5B.

For example, when the threshold probability is set to 0.1 and the communication processor 200 generates a random number equal to or greater than 0 and equal to or less than 1, the generated random number and 0.1 may be compared.

When the generated random number is equal to or greater than 0.1, the communication processor 200 may select any one of the plurality of modes based on the policy information, and when the generated random number is less than 0.1, the communication processor 200 may randomly select the mode. That is, it may be expected that among 10 operations of selecting the mode, the mode is randomly selected in one operation and the mode is selected based on the policy information in nine operations.

Embodiments of the inventive concepts may provide for selecting the mode randomly at a certain probability, and verify whether the policy information is appropriately defined based on the value function expected value generated according to the randomly selected mode. For example, the wireless communication device 10 may perform an operation related to interference whitening in a mode different from the mode selected randomly and stored in the policy information. In this case, when the value function expected value according to the policy information is less than the value function expected value according to the randomly selected mode, the wireless communication device 10 may change the policy information.

According to embodiments, when the mobility of the wireless communication device 10 is high, the possibility that a channel environment has changed may be high, and in this case, the threshold probability may be set high, and thus a frequency of verification of the policy information may further increase.

FIGS. 5A and 5B are diagrams illustrating tables in which policy information is stored according to different embodiments.

The memory device 300 of the wireless communication device 10 of the inventive concepts may store the policy information according to at least one of FIGS. 5A and 5B in the memory device 300, and the communication processor 200 may load the policy information from the memory device 300 to select any one of a plurality of modes. Referring to FIG. 5A, the policy information may be information in which a mode (for example, $a_t$, $a_0$, $a_1$ and $a_2$) to be selected is mapped to a corresponding channel state information (for example, $S_t$, $S_1$, $S_2$, $S_{n-1}$, $S_n$). Referring to FIG. 5B, the policy information may be channel state information and information in which a value function expected value corresponds to each of the plurality of modes. The policy information may also be referred to as a mode selection table or a Q value table.

Referring to FIG. 5A, the policy information may be information in which an operation mode is mapped to each of a plurality of channel state information. Each of the plurality of channel state information may correspond to a signal-to-noise ratio (SNR) section of a channel, and, for example, may correspond to a signal-to-noise ratio (SNR) section in units of 1 dB.

Referring to FIG. 5B, the policy information may be information in which a value function expected value obtained when any one of a plurality of operation modes is performed is stored in each of the plurality of channel state information. For example, when the wireless communication device 10 performs an interference whitening-related operation according to a second mode $a_2$ in second channel state information $S_2$, the NPU 100 may generate and update a fourth value function expected value $Q_4$. A method, performed by the NPU 100, of generating and updating the value function expected value will be described later with reference to FIGS. 6 to 8.

Figure 6:
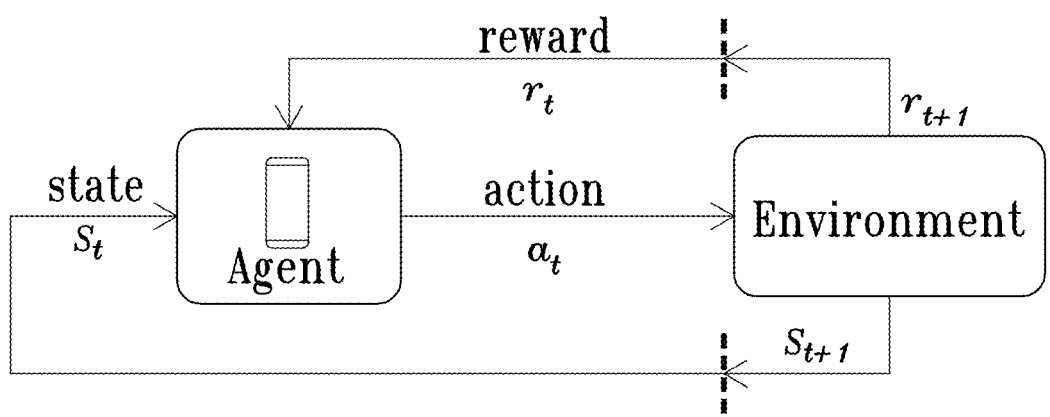
FIG. 6 is a diagram illustrating embodiments of reinforcement learning in which a value function expected value is updated.

FIG. 6 is a diagram illustrating embodiments of reinforcement learning in which a value function expected value is updated.

Reinforcement learning may refer to a machine learning method of learning which action is optimal or more desirable to take in the current state. The wireless communication device 10 may receive a reward value from an external environment whenever performing an operation according to a mode, and learning may proceed in the direction of maximizing or increasing the reward value.

In reinforcement learning, even though an immediate reward value is smaller, an action should be selected so that the total sum of reward values including a value to be obtained later is maximized or increased. An acting user does not know what action maximizes or increases the total sum of reward values, and thus a mode to be selected with respect to the corresponding channel state information may be determined by appropriately considering the immediate reward value and a future reward value.

The NPU 100 of the wireless communication device 10 of the inventive concepts may update a value function expected value based on a change in a channel environment according to the selected mode to perform reinforcement learning. The wireless communication device 10 may obtain channel state information $S_t$ at time t and determine a mode $a_t$ to be performed at the time t based on the obtained channel state information $S_t$. The wireless communication device 10 may perform an operation related to interference whitening according to the mode $a_t$ at the time t, and accordingly, the channel environment may change. As the channel environment changes, the wireless communication device 10 may obtain channel state information $S_{t+1}$ and channel performance information $r_{t+1}$ at a time t+1.

The wireless communication device 10 may obtain an immediate reward value $r_t$ at the time t based on the channel performance information $r_{t+1}$ obtained at the time t+1, and may obtain a future reward value at the time t based on the channel state information $S_{t+1}$ obtained at the time t+1. The NPU 100 may determine a value function expected value corresponding to the channel state information $S_{t+1}$ at the time t+1 as the future reward value at the time t. The NPU 100 may sum the immediate reward value and the future reward value at the time t to calculate an update expected value as shown in Equation 2 below.

$$Q(s_t,a_t) \leftarrow r_{t+1} + \gamma \cdot \max_{a_{t+1}} Q(s_{t+1}, a_{t+1}) \qquad \text{[Equation 2]}$$

Here, $r_{t+1}$ may denote channel performance information at the time t+1, and may denote the immediate reward value at the time t. That is, the channel performance information $r_{t+1}$ obtained by performing the interference whitening operation according to the selected mode $a_t$ may be an evaluation value with respect to a mode selected at the time t. For example, when first channel performance information obtained at the time t+1 by performing an interference whitening operation according to a first mode at the time t is higher than second channel performance information obtained at the time t+1 by performing the interference whitening operation according to a second mode, the wireless communication device 10 may determine that performing the interference whitening operation in the first mode at the time t compared to the second mode is more effective in improving the channel performance.

The wireless communication device 10 may generate the future reward value together with the immediate reward value. The future reward value may be generated based on the channel state information $S_{t+1}$ at the time t+1. The future reward value may be the largest value function expected value among value function expected values obtained when an operation is performed with respect to each of a plurality of modes at the time t+1. That is, the future reward value at the time t may correspond to the largest value among the value function expected values at the time t+1.

According to Equation 2, the wireless communication device 10 may sum a value obtained by multiplying the future reward value by a discount rate γ and the immediate reward value to calculate an update expected value when performing the mode selected at the time t. The discount rate γ may have a value equal to or greater than 0 and equal to or less than 1, and it means that when the discount rate γ is close to 0, the immediate reward value may be evaluated higher, and when the discount rate γ is close to 1, the future reward value may be evaluated higher. A value function calculating the value function expected value is a recursive function that calls a value function expected value at a subsequent time, and calculating the value function expected value according to the recursive function will be described later with reference to FIG. 7.

Figure 7:
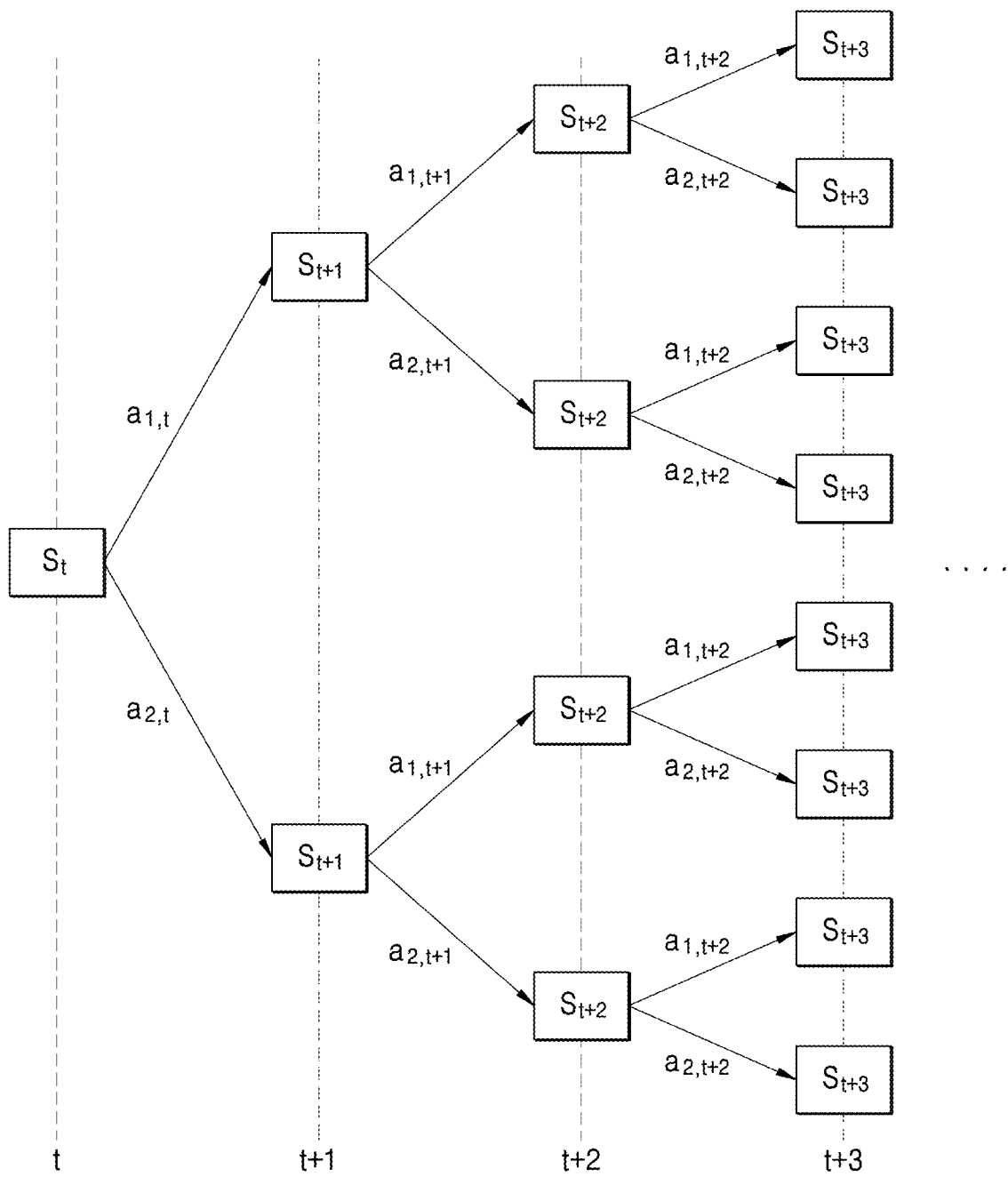
FIG. 7 is a diagram illustrating an example of generating a future reward value based on immediate reward values obtained from a plurality of viewpoints.

FIG. 7 is a diagram illustrating an example of generating a future reward value based on immediate reward values obtained from a plurality of viewpoints.

Referring to FIG. 7, the wireless communication device 10 may select any one of two modes related to an interference whitening operation. The wireless communication device 10 may perform the interference whitening operation according to each mode to obtain different channel state information. For example, the wireless communication device 10 may perform the interference whitening operation according to two modes at the time t to obtain two pieces of channel state information at the time t+1, and each channel state at a time t+1 and perform the interference whitening operation according to two modes in each channel state information at the time t+1 to obtain four pieces of channel state information at a time t+2. In the same way or a similar way, the wireless communication device 10 may obtain eight pieces of channel state information at a time t+3.

The wireless communication device 10 may generate channel performance information based on the channel state information at each time, and calculate a value function expected value based on the channel performance information generated at each time. The value function according to Equation 2 of FIG. 6 is a recursive function and may be expressed as Equation 3 below.

$$Q(s_t, a_t) \leftarrow r_{t+1} + \gamma \cdot \max_{a_{t+1}} (r_{t+2} + \gamma \cdot \max_{a_{t+2}} Q(s_{t+2}, a_{t+2}))$$ [Equation 3]

Referring to FIG. 7, when performing the interference whitening operation according to a first mode $a_{1,t}$ at the time t, the wireless communication device 10 may obtain the channel state information $S_{t+1}$ according to the first mode $a_{1,t+1}$ at the time t+1. The wireless communication device 10 may generate channel performance information according to Equation 1 of FIG. 3 based on the channel state information $S_{t+1}$ at the time t+1, and may use the channel performance information as an immediate reward value.

According to embodiments, the wireless communication device 10 may load a plurality of value function expected values corresponding to the channel state information $S_{t+1}$ at the time t+1 based on the Q value table as in embodiments of FIG. 5B, and may determine a maximum (e.g., highest) value function expected value among the plurality of value function expected values as a future reward value. In this case, each of the plurality of value function expected values may be a sum of an immediate reward value and a future reward value expected when an operation with respect to each of the plurality of modes is performed.

For example, the channel state information $S_{t+1}$ at the time t+1 may correspond to third channel state information $S_3$ of FIG. 5B, and the wireless communication device 10 may determine a larger value of a fifth value function expected value $Q_5$ and a sixth value function expected value $Q_6$ as the future reward value. The fifth value function expected value $Q_5$ may be a value function expected value when the wireless communication device 10 operates in the third channel state $S_3$ in a first mode $a_1$, and the sixth value function expected value $Q_6$ may be a value function expected value when the wireless communication device 10 operates in the third channel state $S_3$ in a second mode $a_2$.

That is, the wireless communication device 10 of the inventive concepts may calculate the value function expected value at the time t so that the sum of immediate reward values after the time t among the plurality of modes is maximized or increased, and the calculated value function expected value may be updated in the Q-value table.

Figure 8:
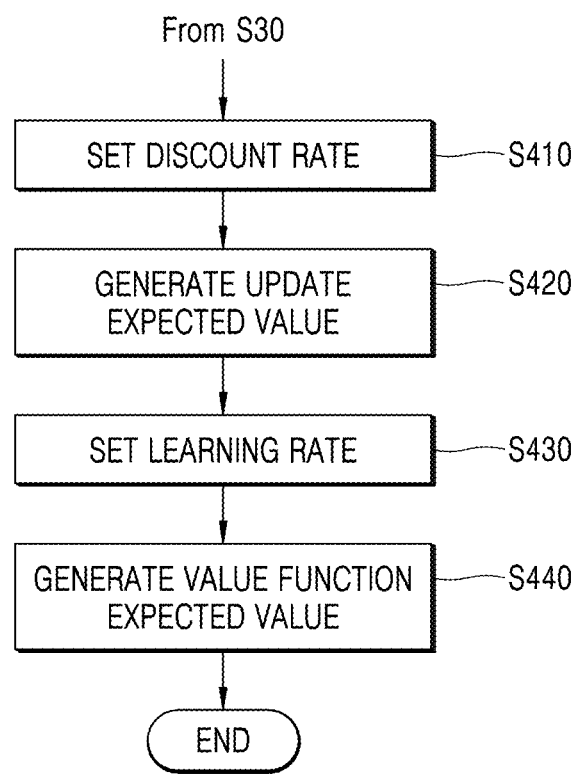
FIG. 8 is a flowchart illustrating a method of generating a value function expected value according to embodiments of the inventive concepts.

FIG. 8 is a flowchart illustrating a method of generating a value function expected value according to embodiments.

Referring to FIG. 8, the wireless communication device 10 may generate the value function expected value at the time t according to Equation 4 below.

$$Q(s_t, a_t) \leftarrow (1-\beta) Q(s_t, a_t) + \beta [r_{t+1} + \gamma \cdot \max_{a_{t+1}} Q(s_{t+1}, a_{t+1})]$$ [Equation 4]

In Equation 4, β may denote a learning rate, and γ may denote a discount rate. $r_{t+1}$ may denote an immediate reward value at the time t, and $\max_{a_{t+1}} Q(s_{t+1}, a_{t+1})$ may denote a future reward value. The NPU 100 may generate an update expected value by multiplying the future reward value by the discount rate and summing the immediate reward value. According to embodiments, the NPU 100 may weighted-average (e.g., based on the learning rate) the update expected value and the previous expected value to generate the value function expected value to be updated. The wireless communication device 10 may determine to what extent the future reward value is to be reflected when generating the value function expected value based on the discount rate, and may determine to what ratio the previous expected value and the update expected value are to be reflected when generating the value function expected value based on a learning rate.

In operation S410, when the update expected value is generated, the discount rate which is a ratio of the immediate reward value and the future reward value may be set. The discount rate has a value equal to or greater than 0, and equal to or less than 1, and may mean that the smaller the discount rate is, the higher the valuation is given to an expected value with respect to a channel performance at a time immediately (or promptly) after an expected value with respect to a future channel performance. According to embodiments, when a higher valuation is given to an improvement of short-term channel performance compared to a long-term channel performance, the wireless communication device 10 may set a lower discount rate than before. According to embodiments, the discount rate may be a design parameter determined through empirical study.

In operation S420, the NPU 100 may generate an update expected value based on the set discount rate. The NPU 100 may generate the update expected value by multiplying the future reward value by the discount rate and summing the immediate reward value.

In operation S430, when generating the value function expected value, a ratio at which the update expected value is reflected may be set as the learning rate. The value function expected value may be generated by weighted-averaging the previous expected value and the update expected value at a certain ratio. The higher the learning rate, the higher the reflection ratio of the update expected value may be set. According to embodiments, the learning rate may be adjusted according to hardware performance of the NPU 100. According to embodiments, the learning rate may be a design parameter determined through empirical study.

In operation S440, the NPU 100 may generate the value function expected value by weighted-averaging the update expected value and the previous expected value based on the learning rate. The previous expected value may be, for example, information stored in the Q value table according to FIG. 5B, and/or may be data loaded from the memory device 300. The update expected value may be an expected value generated as a value different from the previous expected value based on channel state information and channel performance information at the time t+1 when the wireless communication device 10 performs an operation according to any one mode at the time t. More specifically, when the channel state information at the time t+1 is different from channel state information when the previous expected value was generated, another future reward value may be generated, and the channel performance information generated based on the channel state information may be different from previous channel performance information at the time t+1 according to Equation 1, and thus another immediate reward value may be generated. This is because a channel environment may be continuously changed because the wireless communication device 10 moves between a serving base station and a neighboring base station, and other channel states may be continuously changed even when the wireless communication device 10 performs an operation of the same mode or similar modes.

Figure 9:
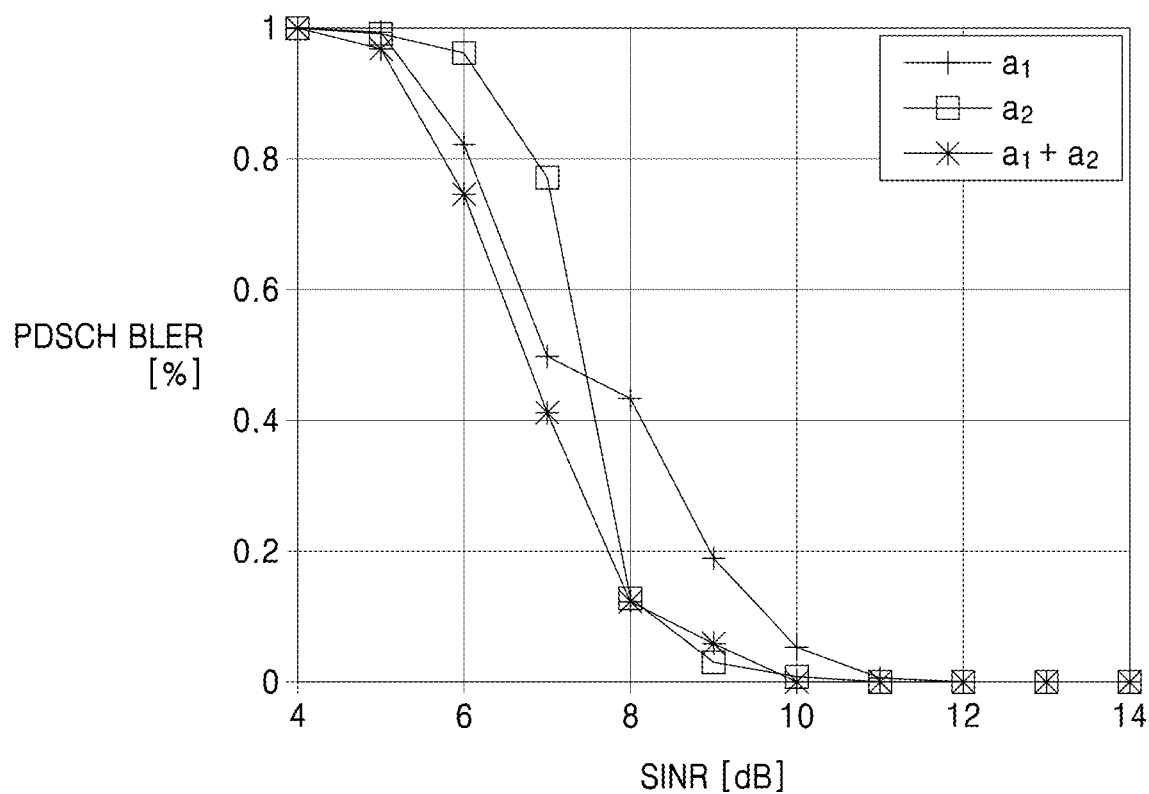
FIG. 9 is a graph illustrating channel performance information improved by updating a value function expected value according to embodiments of the inventive concepts.

FIG. 9 is a graph illustrating channel performance information improved by updating a value function expected value according to embodiments of the inventive concepts.

FIG. 9 is the graph illustrating the channel performance information when the wireless communication device 10 performs an interference whitening operation according to the first mode $a_1$ in a specific channel environment, when the wireless communication device 10 performs the interference whitening operation according to the second mode $a_2$, and when the wireless communication device 10 performs the interference whitening operation based on policy information updated by the value function expected value. In embodiments of FIG. 9, channel state information may be a signal-to-interference-noise ratio (SINR), and the channel performance information may be a block error rate (BLER) (e.g., physical downlink shared channel (PDSCH) BLER). The smaller the BLER, the better the channel performance may be evaluated.

With regard to channel performance information values when the wireless communication device 10 operates in the first mode $a_1$ and when the wireless communication device 10 operates in the second mode $a_2$ in all SINRs, it may be more advantageous to perform the interference whitening operation in the first mode $a_1$ up to 7 dB to channel performance but it may be more advantageous to perform the interference whitening operation in the second mode $a_2$ after 8 dB to channel performance. The policy information of the inventive concepts may be stored in which the interference whitening operation is performed according to any one of the first mode $a_1$ and the second mode $a_2$ for each SINR, and it may be seen that when the wireless communication device 10 selects the mode based on the policy information, the channel performance is further improved compared to when collectively selecting any one mode.

The channel performance information according to FIG. 9 may be measured in a channel environment of rank2 and modulation and coding scheme 5 (mcs5). However, because the wireless communication device 10 of the inventive concepts performs communication in various channel environments, an interference whitening operation mode to be selected according to each channel state information may be adaptively determined. Accordingly, the wireless communication device 10 of the inventive concepts may generate channel state information and channel performance information in real time to calculate the value function expected value, and update the calculated value function expected value to determine the interference whitening operation mode adaptively.

Figure 10:
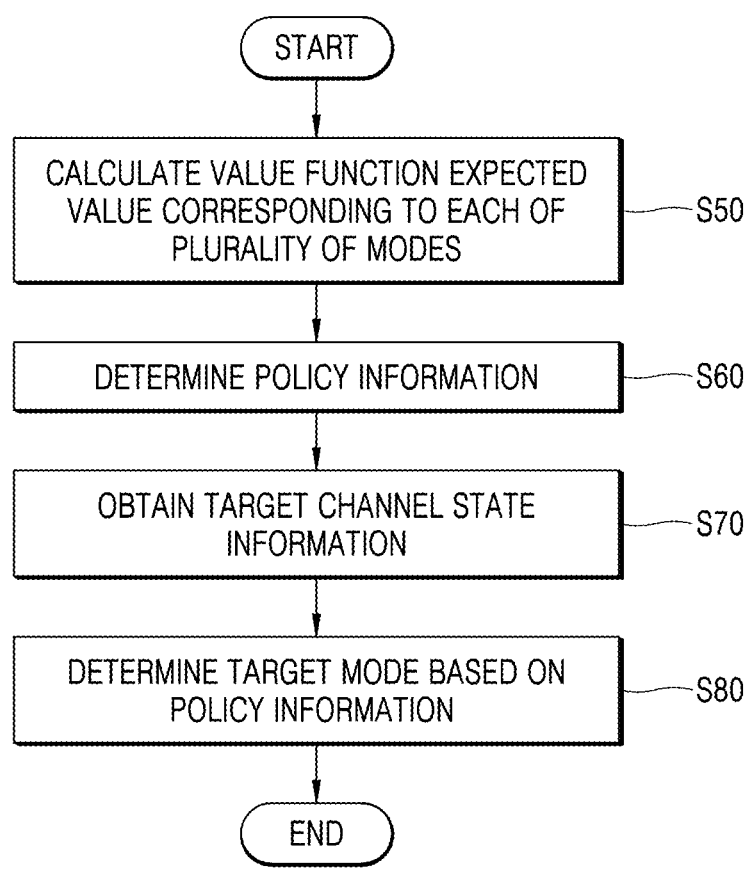
FIG. 10 is a flowchart illustrating a method of determining policy information, and determining a target mode based on the determined policy information, according to embodiments of the inventive concepts.

FIG. 10 is a flowchart illustrating a method of determining policy information, and determining a target mode based on the determined policy information, according to embodiments.

The wireless communication device 10 of the inventive concepts may calculate a value function expected value for each of a plurality of modes, determine the policy information based on the calculated value function expected value, and store the policy information in the memory device 300. The communication processor 200 of the wireless communication device 10 may obtain target channel state information, and determine the target mode corresponding to the target channel state information based on the policy information.

In operation S50, the wireless communication device 10 may calculate a value function expected value corresponding to each of the plurality of modes. The wireless communication device 10 of the inventive concepts may operate according to an interference whitening activation mode and an interference whitening deactivation mode, but is not limited thereto, and may operate according to a plurality of interference whitening modes according to Equation 5 below.

$$a_t = \{Iw^{OFF}, Iw_{1RB}^{ON}, Iw_{2RB}^{ON}, \ldots, Iw_{2^{k-1}RB}^{ON}\} \quad \text{[Equation 5]}$$

Here, $Iw^{OFF}$ denotes an interference whitening deactivation operation, and the interference whitening activation operation may be further divided into k (k is a natural number) modes according to the number of resources for performing the interference whitening operation. $Iw_{1RB}^{ON}$ may denote a mode for performing the interference whitening operation for each resource block, and $Iw_{2RB}^{ON}$ may denote a mode for performing the interference whitening operation for every two resource blocks. When the wireless communication device 10 performs the interference whitening operation for each resource block, accuracy may be increased by subdividing an assigned frequency domain and performing the interference whitening operation, but computational complexity may be increased. Meanwhile, when the wireless communication device 10 performs one interference whitening operation for every two resource blocks, the accuracy may be reduced compared to the mode of $Iw_{1RB}^{ON}$, and thus accuracy may be reduced, but performance may be improved (e.g., resource consumption, such as, power, processor, memory, delay, etc., may be reduced) by reducing the computational complexity. That is, the wireless communication device 10 of the inventive concepts may calculate the value function expected value for selecting an appropriate mode for each channel state with respect to various variables having a trade-off relationship in the channel performance. In operation S60, the wireless communication device 10 may determine the policy information by matching any one of value function expected values with respect to a plurality of modes to the corresponding channel state information. Embodiments in which the wireless communication device 10 determines the policy information by calculating a value function expected value corresponding to each of a plurality of modes will be described later with reference to FIG. 11. According to embodiments, in operation S70, the wireless communication device 10 may obtain target channel state information. According to embodiments, in operation S80, the wireless communication device 10 may determine a target mode based on policy information.

Figure 11:
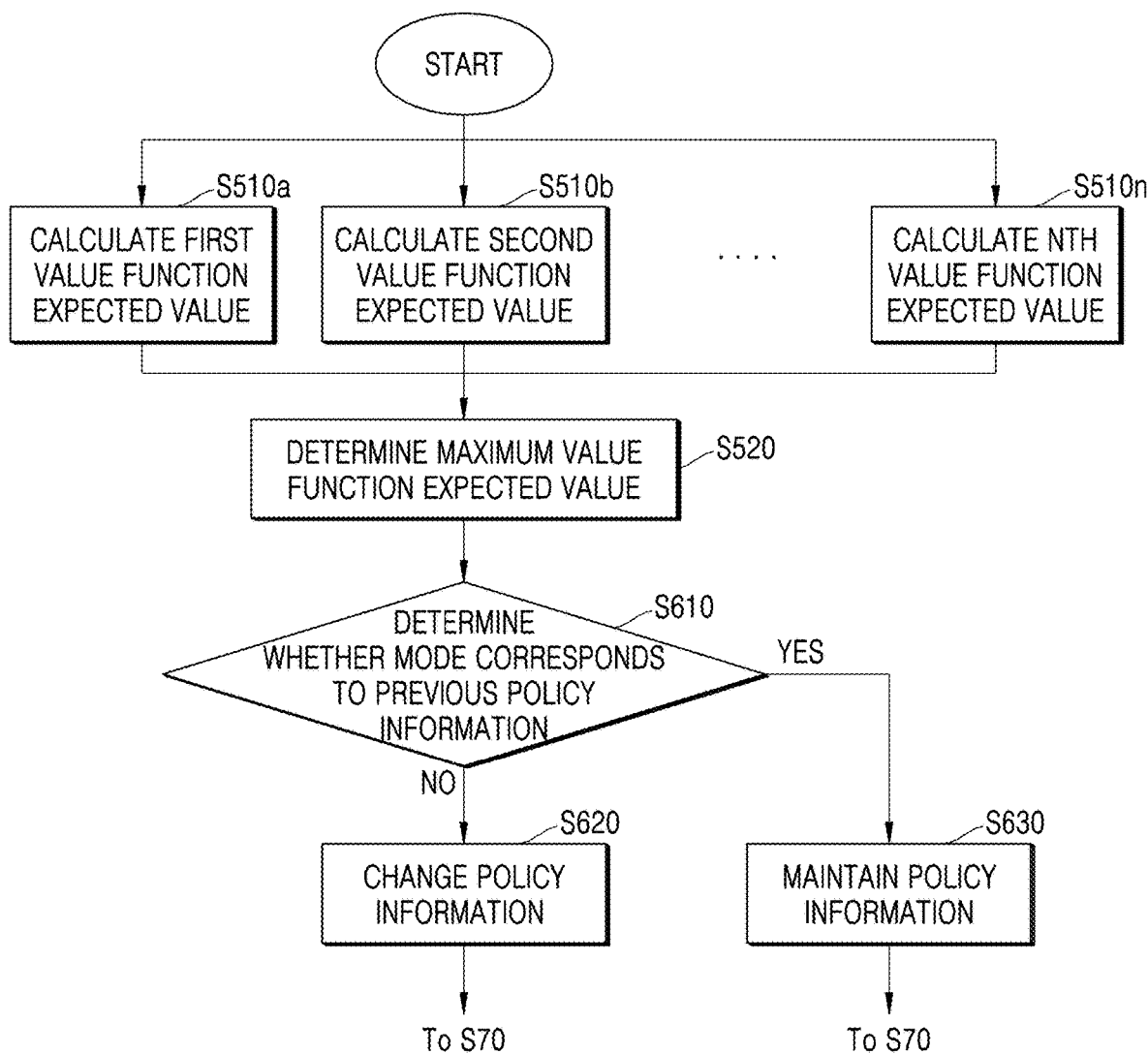
FIG. 11 is a flowchart illustrating determining a maximum (e.g., highest) value function expected value, and determining whether to update policy information based on the determined maximum (e.g., highest) value function expected value, according to embodiments of the inventive concepts.

FIG. 11 is a flowchart illustrating determining a maximum (e.g., highest) value function expected value, and determining whether to update policy information based on the determined maximum (e.g., highest) value function expected value, according to embodiments.

In operations S510*a* to S510*n*, the wireless communication device 10 may calculate a value function expected value with respect to each of a plurality of modes in a specific channel state. For example, in operation S510*a*, the wireless communication device 10 may calculate an expected value of an expected value function as a first value function expected value when operating in a first mode. More specifically, when performing an interference whitening operation according to the first mode, the wireless communication device 10 may calculate the first value function expected value according to obtained next channel state information. In the same way or in a similar way, in operation S510*b*, the wireless communication device 10 may calculate an expected value of an expected value function as a second value function expected value when operating in a second mode.

In operation S520, the wireless communication device 10 may select any one of the value function expected values obtained in operations S510*a* to S510*n*. When channel performance information is a value corresponding to a channel capacity, the wireless communication device 10 may select a largest value function (e.g., the maximum value function) expected value from among the value function expected values, but embodiments of the inventive concepts are not limited thereto. When the channel performance information is a value corresponding to a BLER, the wireless communication device 10 may select a smallest value function (e.g., the minimum value function) expected value from among the value function expected values. In this regard, the wireless communication device 10 may determine which mode corresponds to the selected value function expected value.

When the policy information related to the interference whitening operation of the wireless communication device 10 of the inventive concepts is information in which a mode to be selected corresponding to the channel state information is designated, in operation S610, the wireless communication device 10 may determine whether a mode designated in previous policy information is the mode corresponding to the value function expected value selected in operation S520. For example, when a third value function expected value according to a third mode is determined as the maximum (e.g., highest) value function expected value in operation S520, the wireless communication device 10 may determine whether the third mode is a designated mode corresponding to the corresponding state information.

In operation S620, when the mode corresponding to the value function expected value selected in operation S520 does not correspond to the previous policy information, the wireless communication device 10 may change the policy information. Meanwhile, in operation S630, when the mode corresponding to the value function expected value selected in operation S520 corresponds to the previous policy information, the wireless communication device 10 may maintain the policy information.

Figure 12:
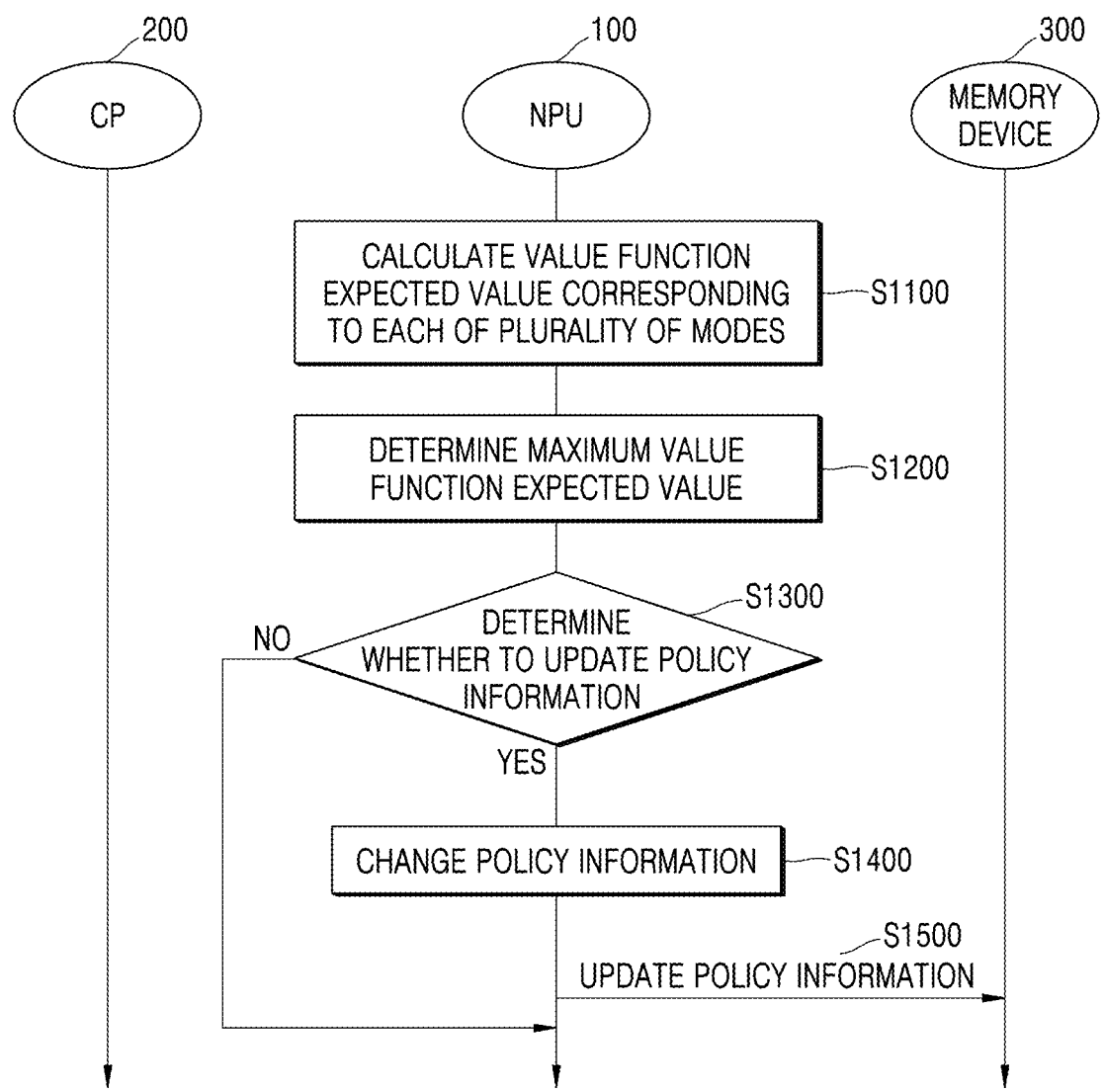
FIG. 12 is a flowchart illustrating a method, performed by components of a wireless communication device, of updating a value function expected value according to embodiments of FIG. 1.
Figure 13:
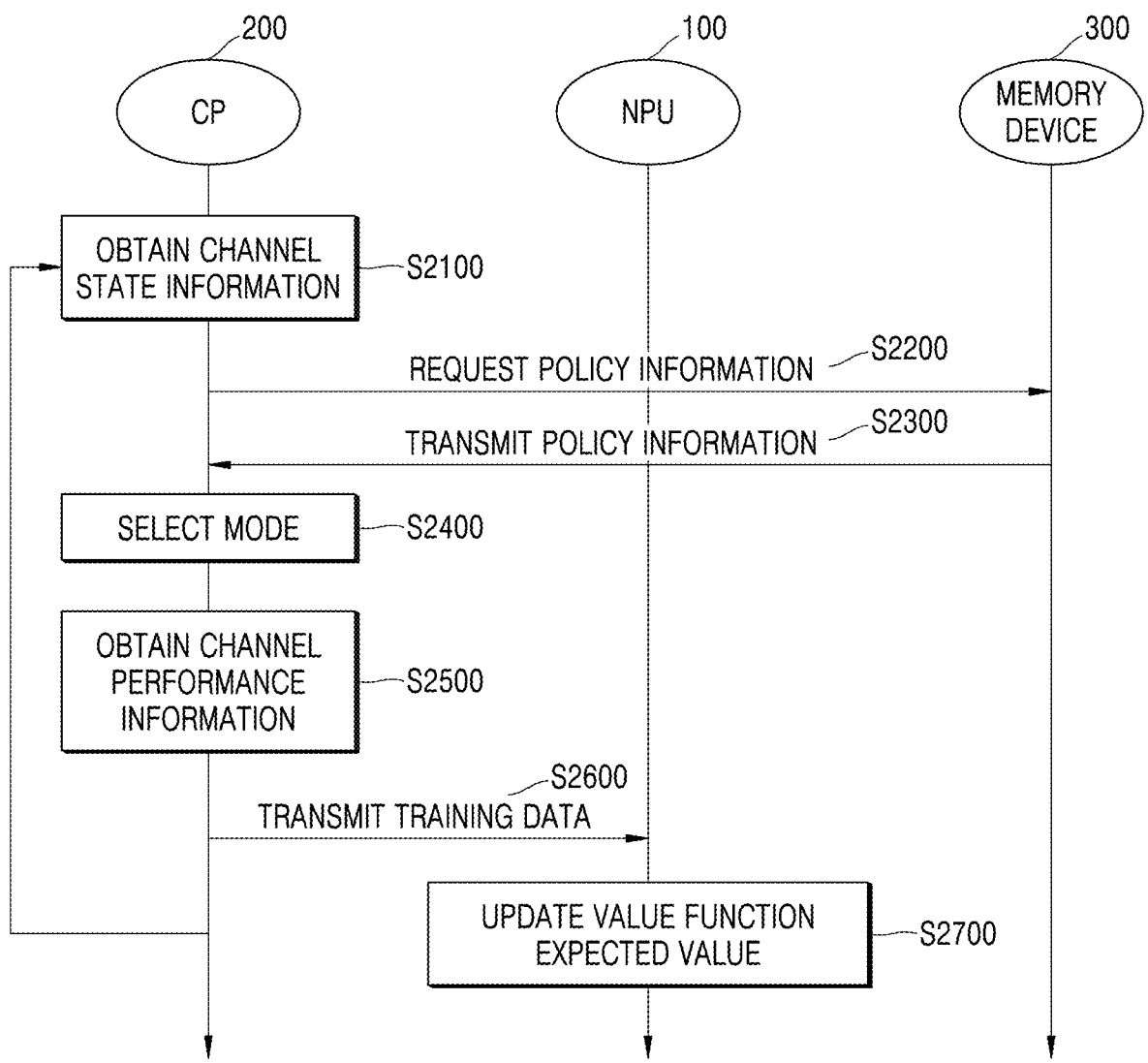
FIG. 13 is a flowchart illustrating a method, performed by components of a wireless communication device, of determining whether to update policy information according to embodiments of FIG. 1.

FIG. 12 is a flowchart illustrating a method, performed by components of the wireless communication device 10, of updating a value function expected value according to embodiments of FIG. 1. FIG. 13 is a flowchart illustrating a method, performed by components of the wireless communication device 10, of determining whether to update policy information according to embodiments of FIG. 1.

Referring to FIGS. 12 and 13, the NPU 100 and the communication processor 200 of the wireless communication device 10 of the inventive concepts may obtain channel state information to determine an interference whitening operation mode, thereby calculating the value function expected value, and determining whether to change the policy information based on the calculated value function expected value. The NPU 100 and the communication processor 200 may store the policy information or the value function expected value determined according to an operation in the memory device 300 and may update stored previous policy information or value function expected value.

Referring to FIG. 12, in operation S1100, the NPU 100 may calculate a value function expected value with respect to each of a plurality of modes in a first channel state corresponding to a first time. According to embodiments, when performing an interference whitening operation corresponding to each of the plurality of modes at the first time, the communication processor 200 may obtain channel state information at a second time after the first time. The NPU 100 may calculate the value function expected value with respect to each of the plurality of modes based on the obtained channel state information at the second time. Calculation of the value function expected value corresponding to each mode by the NPU 100 has been described with reference to FIGS. 6 to 8, and thus a detailed description thereof will be omitted.

In operation S1200, the NPU 100 may select any one of the value function expected values with respect to the plurality of modes. For example, the NPU 100 may determine a largest value function expected value among the value function expected values as the maximum (e.g., highest) value function expected value, and determine which of the plurality of modes corresponds to the maximum (e.g., highest) value function expected value.

In operation S1300, the NPU 100 may determine whether the policy information in which a mode to be selected is designated for each channel state information should be updated. For example, the NPU 100 may determine whether a mode designated in the previous policy information in correspondence to first channel state information and the mode corresponding to the maximum (e.g., highest) value function expected value determined in operation S1200 are the same or similar. When the modes are the same or similar, the NPU 100 may determine that the policy information should not be updated with respect to the first channel state.

In operation S1400, when it is determined that the two modes compared in operation S1300 are not the same or similar, the NPU 100 may change the policy information. In operation S1500, because the policy information is changed, the NPU 100 may change a mode corresponding to the first channel state information in the memory device 300 in which the previous policy information is stored to update the policy information.

The wireless communication device 10 of the inventive concepts is not limited to determining the policy information according to operations S1100 to S1500 only when the previous policy information is stored and when the policy information is updated, and the wireless communication device 10 may perform operations S1100 to S1500 during a process of initializing and resetting the wireless communication device 10 to perform a communication operation. For example, the wireless communication device 10 may calculate value function expected values with respect to a plurality of channel state information, and may determine the maximum (e.g., highest) value function expected value for each channel state information, thereby determining the policy information. According to embodiments, operations S1100 to S1500 may be performed to initialize policy information with respect to value function expected values in response to initializing the communication processor 200 of the wireless communication device 10.

Referring to FIG. 13, when the policy information is determined and the wireless communication device 10 performs a communication operation through a serving base station, channel state information of a communication channel may be obtained. The communication processor 200 of the wireless communication device 10 may load the policy information about the obtained channel state information from the memory device 300 to perform an operation related to interference whitening. In this regard, the NPU 100 may generate a value function expected value based on the channel performance information obtained by performing the operation, and update the policy information based on the generated value function expected value.

In operation S2100, the communication processor 200 may obtain the first channel state information at the first time. For example, the communication processor 200 may generate a SNR of a received signal as the first channel state information. In operation S2200, the communication processor 200 may request policy information corresponding to the first channel state information from the memory device 300, and in operation S2300, the memory device 300 may provide the policy information to the communication processor 200. The policy information may be information stored by designating a value function expected value or an operation mode corresponding to the first channel state information.

In operation S2400, the communication processor 200 may select a mode corresponding to the first channel state information based on the received policy information. For example, when an interference whitening deactivation mode is designated in the first channel state information in the policy information, the communication processor 200 may perform the communication operation without performing an interference whitening operation.

In operation S2500, the communication processor 200 may perform the operation based on the selected mode to obtain second channel state information at a second time after the first time, and generate channel performance information based on the second channel state information.

In operation S2600, the communication processor 200 may provide the NPU 100 with at least some of the channel state information and the channel performance information at the first time and the second time as training data. For example, the communication processor 200 may provide the first channel state information, the operation mode selected based on the first channel state information, the second channel state information, and/or second channel performance information to the NPU 100.

In operation S2700, the NPU 100 may generate a value function expected value based on the training data received from the communication processor 200 and update the value function expected value. According to embodiments, the NPU 100 may set the channel performance information at the second time as an immediate reward value, and calculate the value function expected value with respect to the second channel state information as a future reward value to generate an update expected value. According to embodiments, the NPU 100 may calculate a first value function expected value and a value function expected value corresponding to the selected mode by weighted-averaging the update expected value and a previous expected value. When the value function expected value is designated and stored in the policy information, the NPU 100 may change a previous value function expected value to the calculated value function expected value to update the value function expected value.

Conventional devices for performing interference whitening operations execute these operations without consideration of a device environment. Accordingly, in environments in which the quality of noise samples is poor, such as those having insufficient noise samples or in which noise is more dominant than interference, the conventional devices are unable to sufficiently improve the quality of communication signals by performing the interference whitening operations. Thus, in such environments, the transmission and/or reception performance of the conventional devices deteriorates.

However, according to embodiments, improved devices are provided for performing interference whitening operations. For example, the improved devices may adaptively select an interference whitening mode based on a device environment. Different interference whitening modes may correspond to different amounts of resources to be used in performing the interference whitening operations. Accordingly, the improved devices may select an interference whitening mode that uses greater resources to improve the accuracy of the interference whitening operations in environments in which the quality of noise samples is poor. Thus, the improved devices overcome the deficiencies of the conventional devices to sufficiently improve the quality of communication signals by performing the interference whitening operations, and thereby, improve transmission and/or reception performance.

According to embodiments, operations described herein as being performed by the wireless communication device 10, the NPU 100, the communication processor 200, the value function expected value generation circuit 110, the policy information generation circuit 120, the interference whitening processor 210, the interference whitening controller 220, and/or the channel information generation circuit 230 may be performed by processing circuitry. The term 'processing circuitry' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In embodiments, the processing circuitry may perform some operations (e.g., the operations described herein as being performed by the NPU 100, the value function expected value generation circuit 110, a policy information generation circuit 120, and/or a neural network model trained thereby) by artificial intelligence and/or machine learning. As an example, the processing circuitry may implement an artificial neural network that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. An operating method of a wireless communication device performing an interference whitening operation, the operating method comprising:
   obtaining first channel state information of the wireless communication device;
   selecting a selected mode from among a plurality of modes related to the interference whitening operation, the selected mode corresponding to the first channel state information, and each of the plurality of modes corresponding to a respective value function expected value among a plurality of value function expected values;
   obtaining channel performance information according to the selected mode; and
   updating a first value function expected value based on the first channel state information, the selected mode, and the channel performance information, the first value function expected value being among the plurality of value function expected values, and the first value function expected value corresponding to the selected mode.

2. The operating method of claim 1, wherein the plurality of modes comprise an interference whitening activation mode and an interference whitening deactivation mode.

3. The operating method of claim 2, wherein the interference whitening activation mode is one of a plurality of interference whitening activation modes, each of the plurality of interference whitening activation modes corresponding to a different number of resource blocks assigned to interference whitening.

4. The operating method of claim 1, wherein the selecting the selected mode is based on policy information with respect to the first channel state information.

5. The operating method of claim 1, wherein the selecting the selected mode comprises:
   randomly selecting the selected mode according to a certain probability; and
   selecting the selected mode based on policy information with respect to the first channel state information according to an inverse of the certain probability.

6. The operating method of claim 5, further comprising:
   changing the policy information based on a second value function expected value obtained being greater than a third value function expected value, the second value function expected value being based on a corresponding selected mode obtained by random selection, and the third value function expected value being based on a corresponding selected mode obtained based on the policy information.

7. The operating method of claim 1, wherein
   the updating the first value function expected value comprises generating an immediate reward value corresponding to the channel performance information, the channel performance information corresponding to second channel state information obtained according to the selected mode; and
   updating the first value function expected value based on the immediate reward value and a future reward value obtained based on the second channel state information.

8. The operating method of claim 7, wherein the updating the first value function expected value based on the immediate reward value and the future reward value comprises determining the future reward value based on the second channel state information and the plurality of value function expected values.

9. The operating method of claim 8, wherein the updating the first value function expected value comprises generating an updated first value function expected value by weighted-averaging an update expected value and a previous expected value based on a learning rate, the update expected value being generated based on the immediate reward value and the future reward value.

10. The operating method of claim 9, wherein the generating the updated first value function expected value comprises generating the update expected value by summing the immediate reward value with a value obtained by multiplying the future reward value by a discount rate.

11. The operating method of claim 1, wherein
the first channel state information comprises a signal to interference plus noise ratio (SINR); and
the channel performance information comprises an absolute value of a difference between a channel capacity and a threshold value.

12. An operating method of a wireless communication device performing an interference whitening operation, the operating method comprising:
obtaining first channel state information of the wireless communication device;
selecting a selected mode from among a plurality of modes related to the interference whitening operation, the selected mode corresponding to the first channel state information;
obtaining channel performance information according to the selected mode; and
updating a value function expected value based on the first channel state information, the selected mode, and the channel performance information,
wherein the operating method further comprises initializing policy information with respect to the value function expected value in response to initializing a communication processor of the wireless communication device.

13. A wireless communication device comprising: processing circuitry configured to,
obtain first channel state information,
select a selected mode from among a plurality of modes related to an interference whitening operation, the selected mode corresponding to the first channel state information, and each of the plurality of modes corresponding to a respective value function expected value among a plurality of value function expected values,
obtain channel performance information corresponding to the selected mode, and
update a first value function expected value based on the first channel state information, the selected mode, and the channel performance information, the first value function expected value being among the plurality of value function expected values, and the first value function expected value corresponding to the selected mode.

14. The wireless communication device of claim 13, wherein the plurality of modes comprise an interference whitening activation mode and an interference whitening deactivation mode.

15. The wireless communication device of claim 13, further comprising:
a memory storing policy information designating first channel state information in association with the plurality of modes,
wherein the processing circuitry is configured to select the selected mode based on the policy information with respect to the first channel state information.

16. The wireless communication device of claim 13, wherein the processing circuitry is configured to:
generate an immediate reward value corresponding to the channel performance information, the channel performance information corresponding to second channel state information obtained according to the selected mode; and
update the first value function expected value based on the immediate reward value and a future reward value obtained based on the second channel state information.

17. The wireless communication device of claim 16, wherein the processing circuitry is configured to determine the future reward value based on the second channel state information and a plurality of value function expected values corresponding to the plurality of modes.

18. The wireless communication device of claim 13, wherein the first channel state information comprises a signal to interference plus noise ratio (SINR); and
wherein the channel performance information comprises an absolute value of a difference between a channel capacity and a threshold value.

* * * * *